Oct. 6, 1959  A. W. O'HARA  2,907,110
ANTI-FOGGING DEVICE FOR DENTAL MIRRORS
Filed Aug. 29, 1958  2 Sheets-Sheet 1
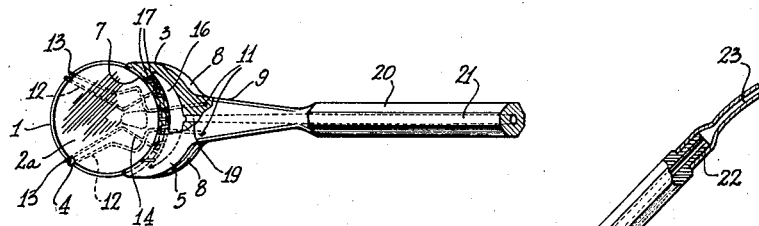
Fig-1-
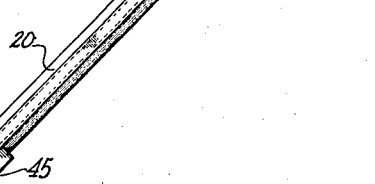
Fig-2-
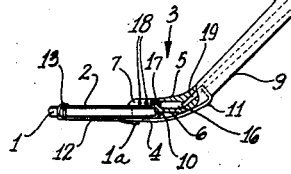
Fig-2a-
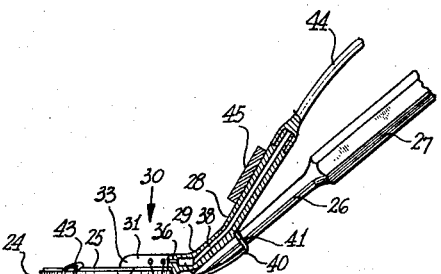
Fig-3-
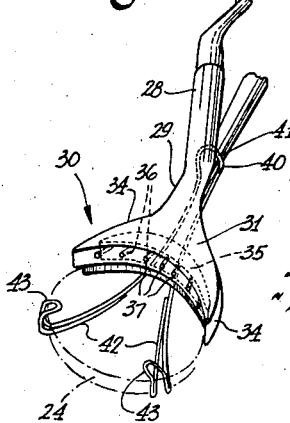
Fig-4-
INVENTOR
Allan W. O'Hara
BY Alex. E. MacRae
ATTORNEY Oct. 6, 1959 A. W. O'HARA 2,907,110
ANTI-FOGGING DEVICE FOR DENTAL MIRRORS
Filed Aug. 29, 1958 2 Sheets-Sheet 2
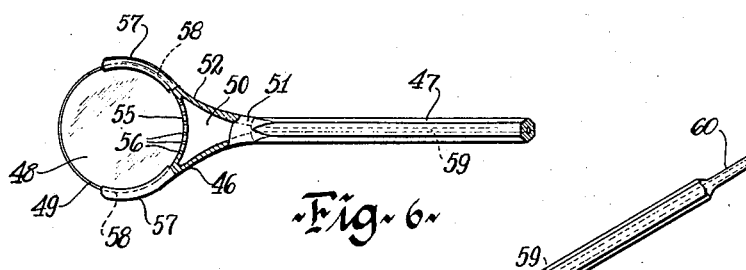
Fig-6-
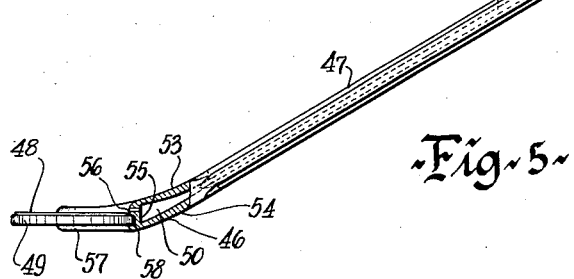
Fig-5-
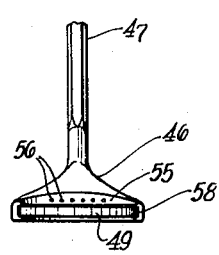
Fig-7-
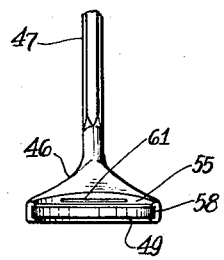
Fig-8-
INVENTOR
Allan W. O'Hara
BY Alex. E. MacRae
ATTORNEY

2,907,110

ANTI-FOGGING DEVICE FOR DENTAL MIRRORS

Allan W. O'Hara, Kingston, Ontario, Canada, assignor to Shirley O'Hara, Kingston, Ontario, Canada Application August 29, 1958, Serial No. 758,112

8 Claims. (Cl. 32—69)

This application relates to dental mirrors, and is a continuation-in-part of application Serial No. 734,498, filed May 12, 1958.

As indicated in the said application, the problem of maintaining the reflecting surface of a dental mirror clear and free from fogging or moisture condensation when in use has long been recognized and, while various means have heretofore been proposed for solving the problem, dentists are still conscious of the need for a practical device to adequately meet the need.

It is an object of this invention to provide an anti-fogging device for dental mirrors which may be readily and inexpensively incorporated in or mounted upon the structure of dental mirrors, and which constitutes an improved device of this character.

The invention contemplates the provision of an air distributing housing having an arcuate forward wall arranged to extend partially about the periphery of the frame of a circular dental mirror, said housing having a chamber therein and air outlet means in said forward wall leading from said chamber for distribution of air over the surface of said mirror, and means for supplying an air stream to said chamber.

The invention will be described with reference to the accompanying drawings, in which, Figure 1 is a partial plan view, partly in section, of a dental mirror in accordance with the invention, Figure 2 is a side elevation, partly in section, of the mirror structure illustrated in Figure 1, Figure 2a is a partial bottom plan view, Figure 3 is a partial side elevation, partly in section, of a modified form of dental mirror structure, Figure 4 is a partial perspective view of the mirror structure illustrated in Figure 3, Figure 5 is a partial plan view partly in section of another modified form of the invention, Figure 6 is a side elevation partly in section, of the mirror illustrated in Figure 5, Figure 7 is a partial end elevation of the mirror illustrated in Figure 5, and Figure 8 is a partial end elevation showing an alternative form of air outlet means for the mirror illustrated in Figure 5.

Referring to Figures 1 and 2, a dental mirror is shown having a circular frame 1 supporting a member 2 with reflecting surface 2a.

The frame 1 is carried by a generally crescent-shaped housing 3 as by means of a spring clip 4 whereby the frame and mirror proper may be readily separated from or mounted upon the housing.

The housing has a top wall 5, a bottom wall 6, an arcuate concave forward wall 7, and side walls 8 merging into a rearwardly extending shank 9. An arcuate shoulder 10 is preferably formed adjacent to the lower corner of forward wall 7 to provide a seat for the mirror frame 1. It will be apparent that, when the frame 1 is seated in the shoulder 10, the arcuate forward wall 7 extends partially about the periphery of frame 1 and above the plane of the mirror surface 2a. Preferably, the forward wall 7 extends around at least one-third but less than one-half the periphery of the frame.

The clip, as shown, comprises a wire strand having its two ends 11 anchored in the bottom wall 6 of the housing. The clip has a pair of arms 12 each with a hooked end portion 13 arranged to grip the frame 1 at spaced points as well as a third arm 14 extending over the periphery of the frame 1 intermediate the ends of shoulder 10, which is recessed at 15 to receive arm 14. A boss 1a may be provided on the bottom surface of frame 1 for projection between the legs of arm 14 to retain the frame in non-rotative relation in the clip.

The housing 3 contains a chamber 16 adjacent to and extending throughout the major portion of the length of forward wall 7. Chamber 16 has a plurality of passages 17 leading to the wall 7, each of such passages having an outlet 18 in such wall 7. Chamber 16 also has an air inlet passage 19 extending rearwardly through shank 9. A handle 20, which may be integral with the shank 9 and housing 3 constitutes a continuation of the shank and with an axial bore 21 constituting a continuation of passage 19. The free end of the handle may terminate in a nipple 22 to which may be attached a flexible tube 23 or the like for supply of a stream of air to bore 21, passage 19, and chamber 16. As shown, the passage 19 may be of gradually restricted cross-sectional area from bore 21 to chamber 16.

In use, air under pressure is admitted through the tube 23 and flows through bore 21, passage 19, chamber 16, passages 17, and outlets 18 in forward wall 7. It will be apparent that the outlets 18, by reason of the particular arrangement of forward wall 7 and its association with reflecting surface 2a, as described, will distribute the air stream substantially uniformly over the entire extent of surface 2a. The air stream is preferably under just sufficient pressure to maintain the surface 2a clean and free of moisture condensation.

Referring to Figures 3 and 4, the dental mirror shown is of conventional form with circular frame 24 carrying a reflecting member with reflecting surface 25, shank 26, and handle 27. The attachment in accordance with the invention comprises a tubular stem 28 having a neck 29 at one end thereof merging into an air distributing housing 30. Housing 30 is quite similar to housing 3 and has top wall 31, bottom wall 32, arcuate forward wall 33, and side walls 34 merging into the neck 29. The housing has a chamber 35, passages 36 leading to outlets 37 in forward wall 33, an air inlet passage 38 which extends through stem 28.

The housing is also provided with a shoulder 39 for reception of the mirror frame.

Means for mounting the attachment on the dental mirror comprises a clip 40 which removably fastens the attachment to the mirror with the mirror frame seated on the shoulder 39. The clip includes a U-shaped intermediate portion 41 fixed to stem 28 and adapted to embrace the shank 26, and a pair of flared end portions 42 adapted to extend under the frame 24 and each having a jaw 43 arranged to grip the frame 24 at spaced points.

It will be observed that, when the attachment is clipped in place on the mirror, the forward wall 33 of the housing 30 will be positioned with respect to reflecting surface 25 in a manner similar to that of the complementary elements of the embodiment illustrated in Figures 1, 2 and 2a.

The stem 28 is slightly inclined upwardly with respect to the neck 29 whereby it is somewhat spaced from the shank 26 and handle 27 when clipped to the mirror. This permits convenient attachment of a flexible tube 44 to the free end of the stem for admission of air under pressure thereto. It will be clear that, in operation, the device shown in Figures 3 and 4 will function in the same manner as that illustrated in Figures 1, 2 and 2a.

If desired, a magnetic block 45 may be fixed to handle 20, as shown in Figure 2, or to the stem 28, as shown in Figure 3, to facilitate use of the device. Thus, in the case of each modification, the mirror may be attached to a tray or other metallic object by applying the magnetic block thereto in such position that it is readily available for use.

Referring to Figures 5, 6 and 7, the dental mirror illustrated comprises a head 46, a handle 47, and a mirror 48 mounted in a circular frame 49.

The head 46 constitutes a housing for an air chamber 50 and has a neck portion 51 to which the handle 47 is fixed. It will be apparent that the handle may be integral with the head or it may have a screw-threaded connection therewith in a conventional manner. The head has a flared portion 52 with top wall 53, bottom wall 54 and arcuate end wall 55, such end wall having a plurality of aligned apertures 56 constituting jets for outlet of air from chamber 50.

Projecting from each end of end wall 55 and preferably integral therewith is an arcuate arm 57 having substantially the same radius as that of end wall 55. Thus the inner surfaces of arms 57 constitute a continuation of the outer surface of end wall 55, and formed in such inner surfaces and outer surface of the end wall is an arcuate groove 58 such groove being disposed in a plane below that of the apertures 56.

The arc described by the inner surfaces of arms 57 and the outer surface of end wall 55 and the groove 58 is slightly greater than a semicircle. The radius of such arc is approximately equal to that of the outer circumference of frame 49 of mirror 48 whereby the mirror may be removably positioned in the groove 58, as shown in the drawing, and will be retained therein by the extremities of arms 57. It will be apparent that the surfaces forming the groove 58 embrace the frame 49 of the mirror throughout the major portion of its circumference.

The chamber 50 communicates with a bore 59 in handle 47 which has a nipple 60 on its outer end for application of an air hose thereto to supply air under pressure to the chamber 50 to produce air jets through apertures 56. It will be observed that, when the mirror 48 is positioned in groove 58, the apertures are located slightly above the surface of the mirror directed thereto.

Referring to Figure 8, the only change in this modification is that, instead of a plurality of apertures 56 there is provided a fine slit 61 for outlet of air.

The apertures 56 preferably extend in uniformly spaced order through the major circumferential extent of forward wall 55. In the modification shown, there are six such apertures. Likewise, the slit 61 extends throughout the major circumferential extent of the forward wall 55.

I claim:

1. An anti-fogging device for a dental mirror having a frame, a member having a reflecting surface supported by said frame, an air distributing housing having an arcuate forward wall arranged to extend around at least approximately one-third but less than approximately one-half of the periphery of said frame, said housing having a chamber therein and air outlet means in said forward wall communicating with said chamber, and means for supplying an air stream to said chamber.

2. An anti-fogging device for a dental mirror having a frame, a member having a reflecting surface supported by the frame, an air distributing housing having an arcuate forward wall arranged to extend around at least approximately one-third but less than approximately one-half of the periphery of said frame above said reflecting surface, said housing having a chamber therein and a plurality of passages leading from said chamber to said forward wall, said passages having air outlets in said forward wall for distribution of air over said reflecting surface means for attaching said housing to said frame, and means for supplying an air stream to said chamber.

3. An anti-fogging device for a dental mirror having a frame, a member having a reflecting surface supported by the frame, an air distributing housing having an arcuate forward wall arranged to extend around at least approximately one-third but less than approximately one-half of the periphery of said frame above said reflecting surface said housing having a chamber therein and a plurality of passages leading from said chamber to said forward wall, said passages having air outlets in said forward wall for distribution of air over said reflecting surface, said housing having a shoulder for reception of said frame to position said frame with respect to said housing, means for securing said housing to said frame, and means for supplying an air stream to said chamber.

4. An anti-fogging device for a dental mirror having a frame, a member having a reflecting surface supported by the frame, an air distributing housing having an arcuate forward wall arranged to extend around at least approximately one-third but less than approximately one-half the periphery of said frame above said reflecting surface, said housing having a chamber therein and a plurality of passages leading from said chamber to said forward wall, said passages having air outlets in said forward wall for distribution of air over said reflecting surface, said housing having a shoulder for reception of said frame to position said frame with respect to said housing, means for securing said housing to said frame comprising a wire clip having its ends anchored in said bottom wall of said housing, and a plurality of arms releasably engageable with said frame, and means for supplying an air stream to said chamber.

5. An anti-fogging attachment for a dental mirror having a frame, a member having a reflecting surface supported by the frame, a shank carrying said frame, and a handle attached to the shank, said attachment comprising an air distributing housing having an arcuate forward wall arranged to extend around at least approximately one-third but less than approximately one-half of the periphery of said frame above said reflecting surface, said housing having a chamber therein and a plurality of passages leading from said chamber to said forward wall, said passages having air outlets in said forward wall for distribution of air over the said reflecting surface, said housing having a bottom wall, a shoulder projecting from said bottom wall for engagement with said frame, a top wall arranged for disposition above said frame and reflecting surface, a restricted neck, and a tubular stem forming a continuation of said neck, and means for securing said attachment to said mirror.

6. An anti-fogging device for a dental mirror having a circular frame, a member having a reflecting surface supported by said frame, an air distributing housing having an arcuate forward wall and an arcuate arm extending from each end of said forward wall, said arms and forward wall having a continuous groove extending from the end of one of said arms to the end of the other of said arms, said groove being of uniform radius substantially equal to the radius of said frame and having an arcuate extent greater than one-half the circumference of said frame to receive and removably grip said frame, said housing having a chamber therein and an outlet means in said forward wall above said groove, said outlet means communicating with said chamber, and means for supplying an air stream to said chamber to produce a flow of air through said outlet means over the surface of said reflecting surface.

7. An anti-fogging device as defined in claim 6, said air outlet means comprising a plurality of arcuately aligned apertures in said forward wall.

8. An anti-fogging device as defined in claim 6, said air outlet means comprising a slit in said forward wall extending throughout the major arcuate extent thereof.

References Cited in the file of this patent
UNITED STATES PATENTS
1,764,455    Kulik _____ June 17, 1930